United States Patent [19]
Cook

[11] Patent Number: 5,344,263
[45] Date of Patent: Sep. 6, 1994

[54] HIGH-PRECISION INTERCHANGEABLE TOOL HOLDER

[75] Inventor: Warren A. Cook, Arkadelphia, Ark.

[73] Assignee: Carrier Corporation, Syracuse, N.Y.

[21] Appl. No.: 980,032

[22] Filed: Nov. 23, 1992

[51] Int. Cl.⁵ .............................................. B23C 5/26
[52] U.S. Cl. ..................................... 409/233; 408/240
[58] Field of Search ................... 409/233, 232, 234; 408/239 R, 239 A, 240; 279/900

[56] References Cited

U.S. PATENT DOCUMENTS

| Re. 26,623 | 7/1969 | Erikson | 409/233 X |
|---|---|---|---|
| 3,372,951 | 3/1968 | McCash | 409/233 X |
| 4,011,791 | 3/1977 | Lanzenberger | 409/233 |
| 5,141,370 | 8/1992 | Baumann | 409/232 |

Primary Examiner—Z. R. Bilinsky

[57] ABSTRACT

A quill is rotated in a spindle and carries a tool which is rotated with the quill about a common axis. The tool is held in a bore in the quill by a combination of a tool receiver, a drawbar and an attachment member which is shrunk fit to the tool. The overhang of the tool is greatly reduced and tilting takes place through the base of the attachment member rather than through edge loading of the tool in a bore.

3 Claims, 1 Drawing Sheet

HIGH-PRECISION INTERCHANGEABLE TOOL HOLDER

BACKGROUND OF THE INVENTION

The key to any high precision machining operation using a single or multi-fluted rotary tool is to achieve the lowest radial runout and axial deviation from the center line that is possible. Current spindle designs use a tapered device, a collet device or a straight device with a very close fit in an attempt to achieve the desired accuracy. Each of these arrangements requires high precision parts relative to their tapers, clearances etc. These spindle designs retain the tool by: 1) a collet; 2) a drawbar which may be either threaded or of an automatic tool changer type; or, 3) threads and jam nuts. These designs have many pieces which result in the stacking up of tolerances/inaccuracies, there are problems with drawbar balancing, and there are high costs. These designs produce many points in the system with a potential for producing cumulative radial runout and axial deviation. They are, for example, the location of the spindle, the location of the tool holding device in the spindle and the location of the tool in the tool holding device.

Commonly assigned U.S. Pat. No. 5,141,370 addresses the stacking up of tolerances by providing a direct interface between a spindle and a cutting tool. While this improved the accuracy by the elimination of parts, the cantilevered supporting of the tool can introduce errors at the remote, cutting end of the tool.

SUMMARY OF THE INVENTION

The face of a flanged tool is bolted or otherwise held against the face of the spindle. The shank of the tool is held with a second clamping mechanism which may be either hydraulic or a collet. Holding the tool in this manner prevents the tool from coming out at high speed, prevents edge loading of the tool against the opening of the bore, shifts the fulcrum point for tilting the tool, reduces the amount of cantilevering of the tool and generally stiffens the tool.

It is an object of this invention to provide precision tool holding capabilities.

It is an additional object to reduce the cantilevered loading of the tool.

It is another object of this invention to minimize radial runout and axial deviation. These objects, and others as will become apparent hereinafter, are accomplished by the present invention.

Basically, a tool is provided with a shank and a flange. The face of the flange is bolted against the face of the spindle to provide stiffness while the shank is suitably held to prevent radial runout and axial deviation.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
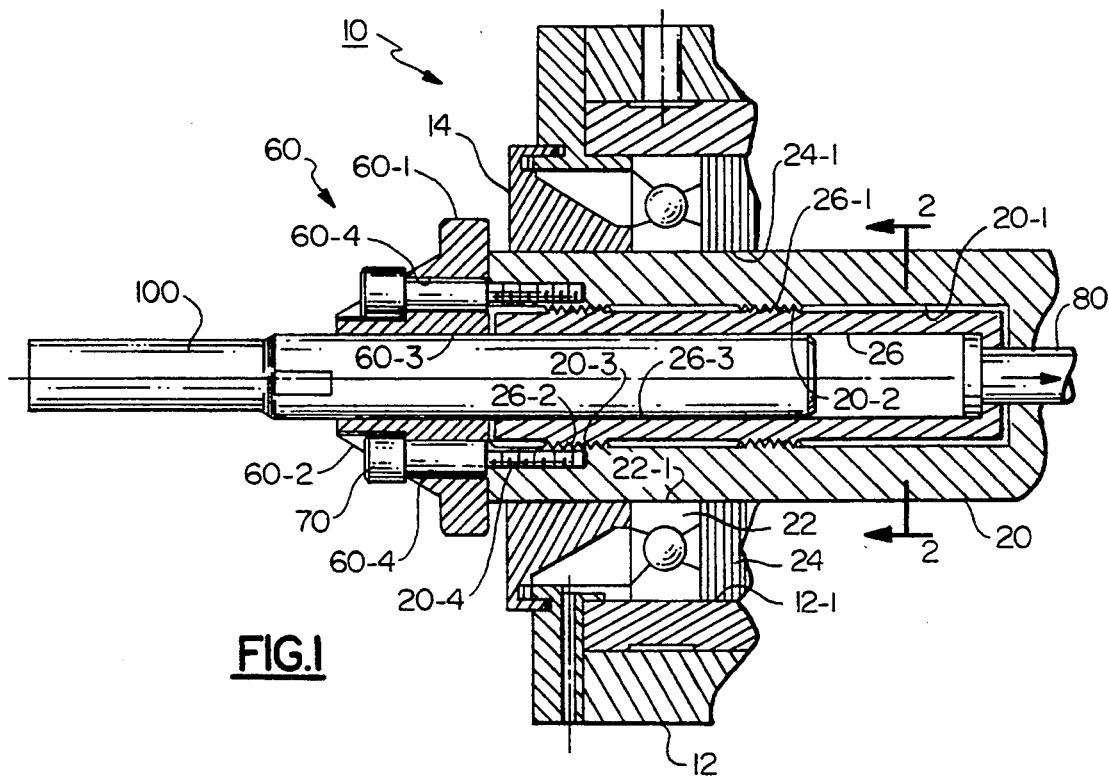
FIG. 1 is a partial partially sectioned view of a tool secured in the tool holder of the present invention.
Figure 2:
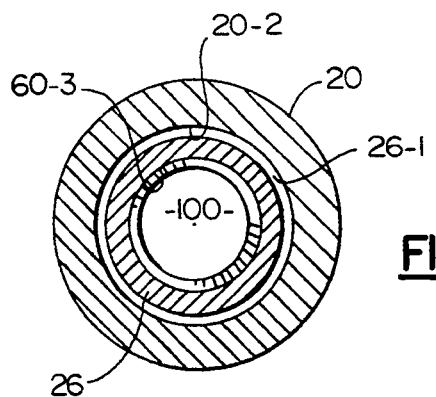
FIG. 2 is a sectional view taken along line 2—2 of FIG. 1.
Figure 3:
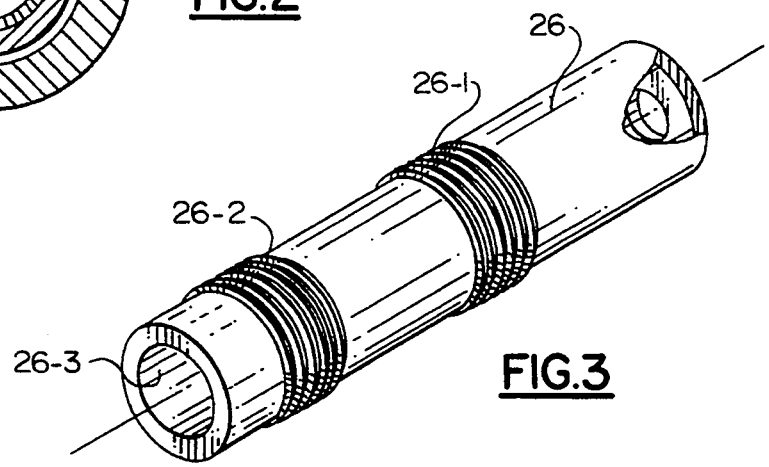
FIG. 3 is a partially cutaway pictorial view of the tool holder.

In FIG. 1, the numeral 10 generally designates a spindle for accurately holding cutting tool 100. Spindle 10 includes a spindle body 12 and a spindle cover and preload assist 14 which is secured to spindle body 12 by bolts (not illustrated) which provide a preload bias. Body 12 has a bore 12-1 which receives rolling element bearing 22, spacer 24 and another rolling element bearing (not illustrated) which collectively form a continuous bore including portions 22-1 and 24-1 which receive and support spindle shaft or quill 20. Quill 20 has a partially threaded bore 20-1 which receives tool receiver 26. Tool receiver 26, as is best shown in FIG. 3, has threaded portions 26-1 and 26-2 which coact with threaded portions 20-2 and 20-3, respectively, of threaded bore 20-1 to secure tool receiver 26 in quill 20. Tool receiver 26 has a bore 26-3 which receives the shank of tool 100 in a tight fit, as shown in FIG. 2. Tool receiver 26 is axially pulled in bore 20-1 by drawbar 80, which squeezes tool 100 along the centerline of bore 26-3 while causing threaded portions 26-1 and 26-2 to axially engage threaded portions 20-2 and 20-3, respectively.

As heretofore described, tool 100 is held in place solely due to the tight fit between the shank of tool 100 and bore 26-3. As a result, there is no structure other than possible contact with the workpiece to prevent the tool 100 from coming out of tool receiver 26 at high speed. Also, the tool 100 would be cantilevered relative to the tool receiver 26 and deflection of tool 100 would produce edge loading at the entrance to bore 26-3.

The present invention adds attachment member 60 which is shrunk fit onto tool 100. Member 60 includes a flange portion 60-1 and a frustoconical portion 60-2. Member 60 has an axial bore 60-3 which receives tool 100 in a shrink fit. A plurality of axial bolt holes 60-4 are radially and circumferentially spaced from bore 60-3 and corresponding threaded bolt holes 20-4 are formed in quill 20. Bolts 70 extend through the respective bolt holes 60-4 and are threaded into bolt holes 20-4 thereby drawing flange 60-1 into face-to-face contact with spindle shaft 20. With flange 60-1 in face-to-face contact with the end of spindle shaft 20, the fulcrum for tilting movement of the integral tool 100 and member 60 is at the circumference of contact between flange 60-1 and the end of spindle shaft 20 and is resisted by bolts 70. The point of flexure of tool 100 would be axially outward of member 60 and, since tool 100 has a greatly reduced overhang relative to member 60, the potential deflection is greatly reduced as is any resulting machining errors due to tool movement.

Quill 20 together with bearing 22, spacer 24 and the bearing (not illustrated) will be held in place by spindle cover and preload assist 14 and bolts (not illustrated). In assembling tool 100 in the spindle 10, tool receiver 26 will be in place in bore 20-1 and will have been installed by effectively threading tool receiver 26 in place as threaded portion 26-1 serially engages threaded portions 20-3 and 20-2 in the nature of a threading action and threaded portion 26-2 engages threaded portion 20-3. Drawbar 80 will be in a relaxed condition. Tool 100 with shrunk fit attachment member 60 secured thereon will be placed in tool receiver 26. Bolts 70 are threaded into bolt holes 20-4 and the subassembly defined by tool 100, member 60 and tool receiver 26 is rigidly secured to spindle shaft or quill 20. Additionally, drawbar 80 is tightened drawing and biasing tool receiver 26 and the subassembly inward as threaded portions 26-1 and 26-2 are axially drawn into contact with threaded portions 20-2 and 20-3, respectively, and the diameter of bore 26-3 reduces causing a tighter gripping of tool 100 by tool receiver 26. To machine with tool 100, quill 20 is rotated in bore 12-1 by a motor (not illustrated) and quill 20, tool receiver 26 attachment member 60 and tool 100 rotate about a common axis. Because of the broad base and radially displaced fulcrum for bending or tilting tool 100 provided by base 60-1 and because of the greatly reduced axial overhang, deflection is reduced as well as the stacking up of errors due to the described arrangement.

Although a preferred embodiment of the present invention has been illustrated and described, other changes will occur to those skilled in the art. For example, attachment member 60 can be attached to the tool receiver 26 rather than the spindle. It is therefore intended that the present invention is to be limited only by the scope of the appended claims.

What is claimed is:

1. A high precision interchangeable tool holder comprising:

a spindle means having an axial bore therein;

a quill means located in said bore in said spindle means so as to be rotatable therein;

tool means having a shaft portion;

attachment means secured to said tool means at an intermediate position on said shaft portion so as to be integral therewith and dividing said tool means into a shank portion and a tool portion;

an axial bore in said quill means;

tool receiving means for receiving said shank portion of said tool means and adapted to be securely received in said axial bore in said quill means such that said quill means and said tool receiving means define integral means;

means for securing said attachment means to said integral means whereby said quill means, said tool receiving means, said attachment means and said tool means are rotatable as a unit.

2. The tool holder of claim 1 wherein said attachment means includes a base portion in facing contact with said integral means, 3. The tool holder of claim 2 wherein said attachment means further includes a tapering porting surrounding said shaft portion and tapering in a converging manner in a direction away from said base portion.

* * * * *